Nov. 17, 1953 V. W. FARRIS 2,659,387
PINCH VALVE MECHANISM
Filed Feb. 8, 1950 2 Sheets-Sheet 2

INVENTOR
VICTOR W. FARRIS
BY Bernard A. Lemlein
ATTORNEY

Patented Nov. 17, 1953

2,659,387

UNITED STATES PATENT OFFICE 2,659,387

PINCH VALVE MECHANISM

Victor Wallace Farris, Tenafly, N. J.

Application February 8, 1950, Serial No. 143,085

2 Claims. (Cl. 137—685)

This invention relates to valves, and more particularly to that type of valve known as a pinch valve and comprising, in general, a flexible conduit, and means for pinching the walls of said conduit to control the flow of fluids therethrough.

While not limited thereto, it is preferred that the valve of the present invention be fluid actuated, and it is the object of the present invention to provide a valve of the general character indicated which is simple in construction, easy and economical to fabricate and assemble, and efficient and positive in its action.

These, and other objects and advantages of the present invention, which will become more apparent as the detailed description progresses, are attained in the following manner.

In its broadest aspect, the present invention provides a flexible conduit, or, more specifically, a flexible conduit section adapted to be inserted in the line through which the flow of fluid is to be controlled, which flexible conduit has in contact therewith, at diametrically opposed points, a pair of jaw members. These jaw members are connected to each other by linkage systems which are pivotally mounted in such a manner that when a force is applied to one of the jaw members, said force is also transmitted to the other jaw member, whereby both jaw members are moved toward each other simultaneously. This pinches the flexible conduit mounted therebetween to control the flow of fluid through said flexible conduit. The force applied, as above stated, to one of the jaw members is transmitted to said jaw member by a diaphragm-actuated plunger, the diaphragm, in turn, being operated upon by a fluid, such as air, a source of which is connected to a housing in which the diaphragm is mounted for reciprocation.

In the accompanying specification there shall be described and in the annexed drawings shown an illustrative embodiment of the present invention. It is, however, to be clearly understood that the present invention is not to be limited to the exact details herein shown and described for purposes of illustration only inasmuch as changes therein may be made without the exercise of invention and within the true spirit and scope of the claims hereto appended.

In said drawings.

Figure 1:
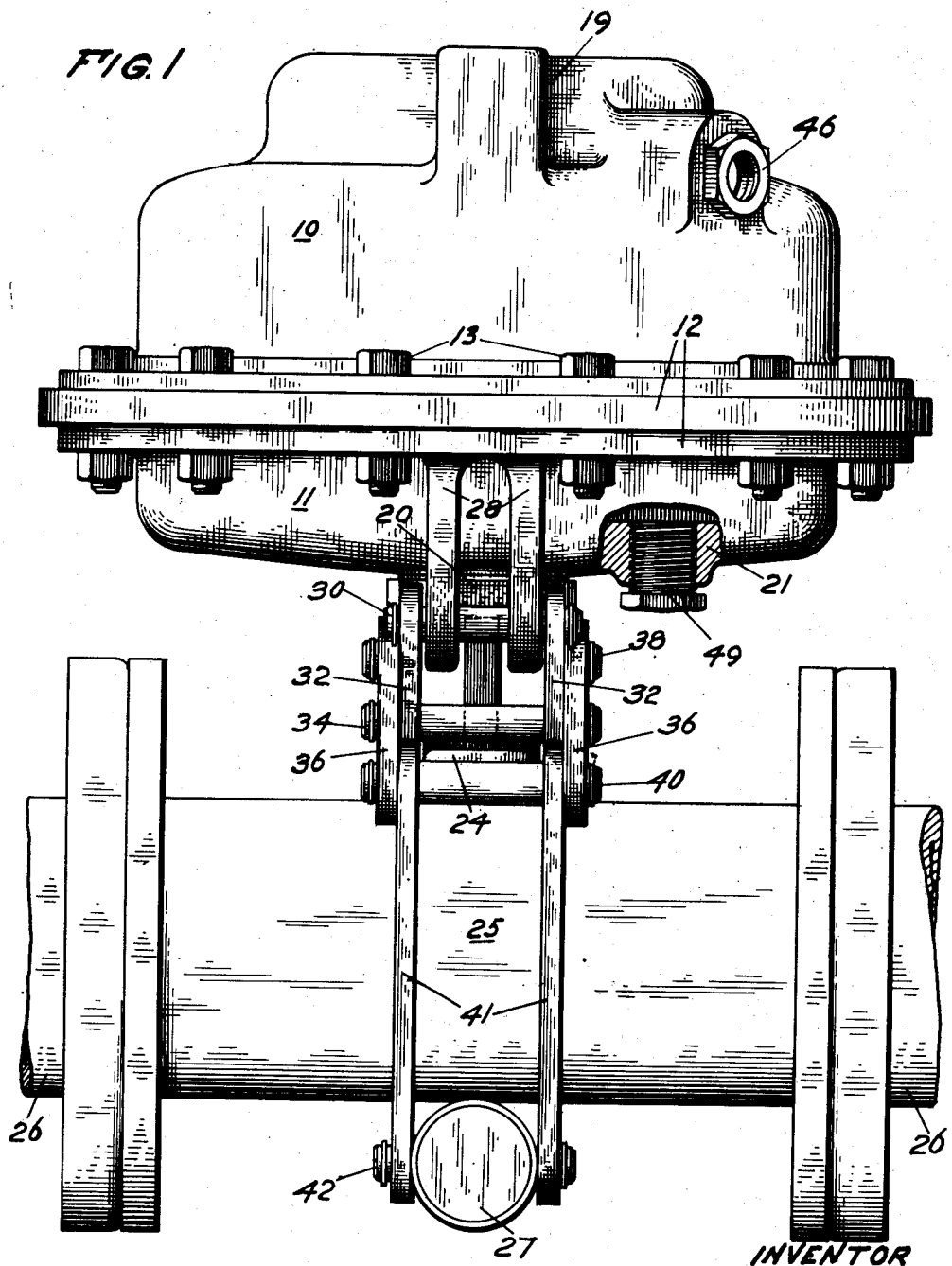
Fig. 1 is a side elevational view of a pinch valve made in accordance with the present invention.
Figure 2:
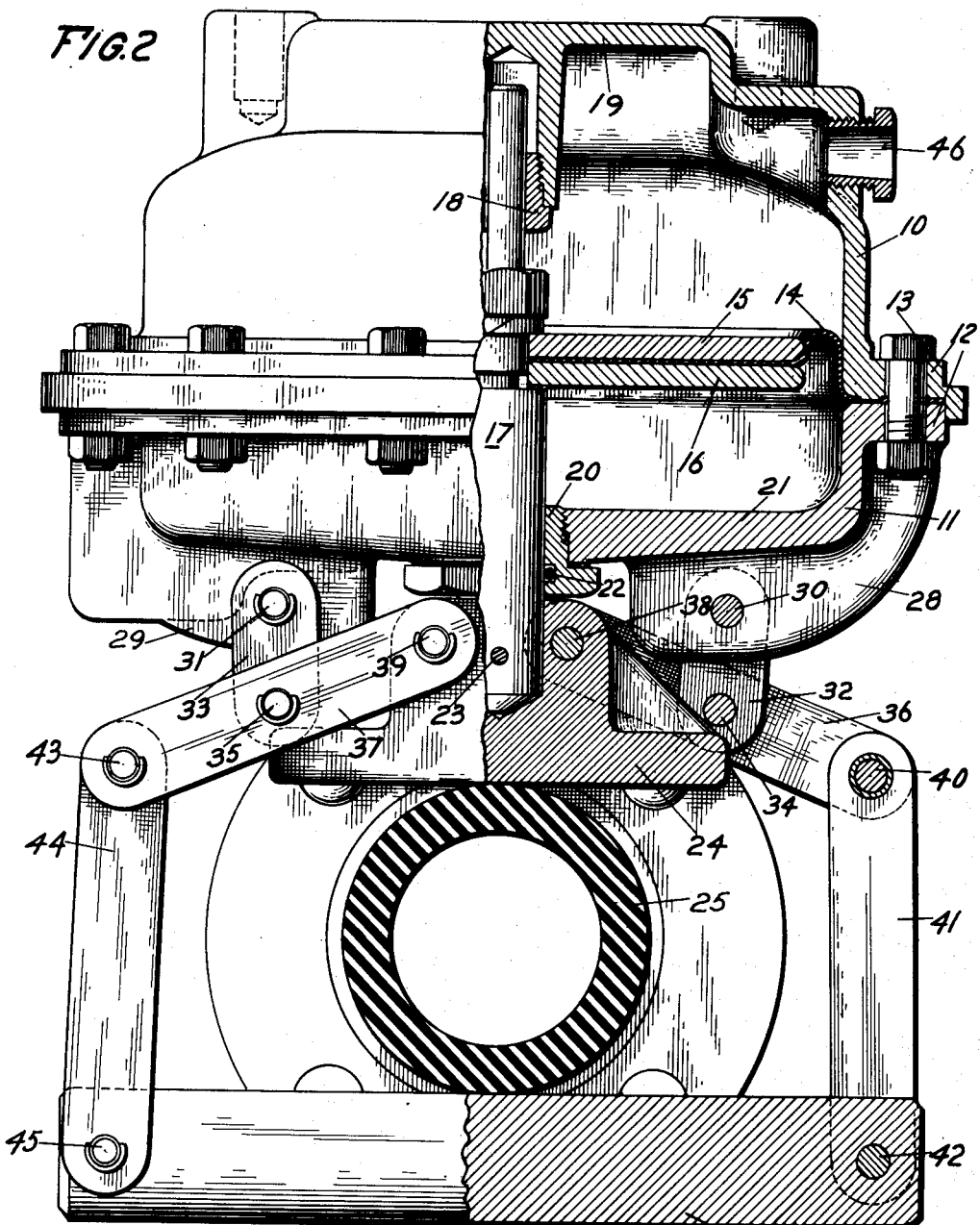
Fig. 2 is a partial side elevational, partial longitudinal sectional view taken at right angles to Fig. 1.

Referring now more in detail to the aforesaid illustrative embodiment of the present invention, with particular reference to the drawings illustrating the same, the numerals 10 and 11 designate, respectively, the upper and lower portions of a housing, said portions being provided with peripheral flanges 12 secured to each other by a plurality of bolts 13. Mounted in the housing, between the flanges 12, is a flexible diaphragm 14 provided on its upper and lower surfaces with rigid discs 15 and 16, the diaphragm and discs being supported at the center on a plunger 17. The plunger is mounted for reciprocation in the housing as by being slidable in a bearing 18, carried by a dome 19 formed on the housing portion 10, and a second bearing 20, carried in the lower wall 21 of the housing portion 11. The plunger extends exteriorly of the housing 10—11 through a packing 22 in the bearing 20.

The exterior end of the plunger 17 is pinned, as at 23, in a recess formed in an inverted, substantially T-shaped jaw member 24, which jaw member is in contact with a flexible conduit section 25 inserted in a line 26 through which it is desired to control the flow of fluid. A second jaw member, which may be in the form of a cylindrical bar 27, also contacts the conduit section 25, at a point diametrically opposed to the point of contact between the jaw member 24 and said conduit section, the arrangement being such that simultaneous movement of the jaw members pinches the conduit section to close the valve.

The mechanism for bringing about this simultaneous movement of the jaw members shall now be described.

At diametrically opposed points the lower housing portion 11 is provided with pairs of ribs 28 and 29, each pair of ribs carrying, respectively, a pintle 30 and 31. Suspended from the pintles 30 and 31 are pairs of links 32 and 33, the free ends of said links, in turn, carrying pintles 34 and 35.

Pivotally mounted on the pintles 34 and 35 are pairs of levers 36 and 37, the inner ends of the levers 36 being pivotally connected, as at 38, to the jaw member 24, and the inner ends of the levers 37 being similarly connected, as at 39, to said jaw member.

The outer ends of the levers 36 carry a pintle 40 on which is rotatably mounted a pair of links 41 the lower ends of which are pivotally connected, as at 42, to one end of the jaw member 27, and the outer ends of the levers 37 carry a pintle 43 on which is rotatably mounted a pair of links 44 the lower ends of which are pivotally connected, as at 45, to the other end of the jaw member 27.

Now, when a force is applied to the plunger 17, the jaw member 24 moves downwardly. At the same time, the levers 36 and 37 are, by reason of their connections to the jaw member, rocked about the pivots 34 and 35. This pulls the links 41 and 44, and the jaw member 27 carried thereby, upwardly, thus pinching the conduit section 25 between the jaw members 24 and 27.

In order to apply force to the plunger 17, the upper housing portion 10 is provided with a fluid port 46 which is connected by a branch pipe 47 to a main pipe 48, in turn, connected to a source of actuating fluid such as air. The lower housing portion 11 is provided with a fluid port 49 which is connected by a branch pipe 50 to the main pipe 48. The branch pipes 47 and 50 are provided with 3-way valves 51 and 52, which valves are displaced 90° with respect to each other and are ganged for simultaneous operation. The valves are also connected to the atmosphere through a T-connection 53.

Figure 3:
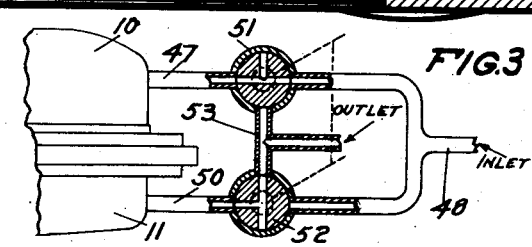
Fig. 3 is a schematic view of the connection of the device to a source of actuating fluid.

The valve arrangement, shown in Fig. 3, is such that when fluid from the pipe 48 is entering the housing 10—11 above the diaphragm 14—15—16, through the valve 51, fluid beneath the diaphragm 14—15—16 passes out of the housing 10—11 to the atmosphere through the valve 52. This operation closes the conduit section 25. Rotation of the valves 51 and 52 through 90°, reverses the fluid flow to and from the housing 10—11 and opens the conduit section 25.

Where the pressure of the fluid flowing through the conduit section 25 is sufficiently high to itself force the jaw members 24 and 27 open, the port 49 in the lower housing portion 11 need not be connected to the actuating fluid source but may communicate directly with the atmosphere.

This completes the description of the aforesaid illustrative embodiment of the present invention. It will be noted from all of the foregoing that the pinch valve of the present invention is simple in construction, easy and economical to fabricate and assemble, and admirably adapted to perform its intended functions.

Other objects and advantages of the present invention will readily occur to those skilled in the art to which the same relates.

What is claimed is:

1. A pinch valve comprising: a flexible conduit; a pair of jaw members engaging said conduit at diametrically opposed points; a pair of linkage systems disposed on opposite sides of said conduit and connecting said jaw members; each of said linkage systems including a lever and a link pivotally connected to each other and, at the free ends thereof, directly to said jaw members on opposite sides of said conduit, with the lever of each of said linkage systems pivotally supported at a fixed point intermediate the connections thereof to the adjacent link and the adjacent jaw member; and means for applying force to one of said jaw members; said linkage systems transmitting said force to the other of said jaw members, whereby said jaw members are simultaneously moved in opposite directions.

2. A pinch valve comprising: a fluid-receiving housing; a plunger mounted for reciprocation in said housing; a flexible conduit; a pair of jaw members engaging said conduit at diametrically opposed points; one of said jaw members being connected to said plunger; and a pair of linkage systems disposed on opposite sides of said conduit and connecting said jaw members; each of said linkage systems including a lever and a link pivotally connected to each other and, at the free ends thereof, directly to said jaw members on opposite sides of said conduit, with the lever of each of said linkage systems pivotally supported from said housing at a fixed point intermediate the connections thereof to the adjacent link and the adjacent jaw member; said linkage systems transmitting the reciprocatory motion applied by said plunger to said one of said jaw members to the other of said jaw members, whereby said jaw members are simultaneously moved in opposite directions.

VICTOR WALLACE FARRIS.

References Cited in the file of this patent

UNITED STATES PATENTS

| Number | Name | Date |
| --- | --- | --- |
| 210,334 | Kinsman | Nov. 26, 1878 |
| 579,501 | Smith | Mar. 23, 1897 |
| 726,962 | Metzger | May 5, 1903 |
| 887,103 | Lane | May 12, 1908 |
| 1,809,091 | Wiken | June 9, 1931 |
| 1,954,920 | Damerell | Apr. 17, 1934 |
| 2,183,835 | Foulke | Dec. 19, 1939 |
| 2,371,434 | Eppler | Mar. 13, 1945 |
| 2,418,821 | Coghill | Apr. 15, 1947 |
| 1,757,548 | Schissler | May 6, 1950 |

FOREIGN PATENTS

| Number | Country | Date |
| --- | --- | --- |
| 873,587 | France | of 1942 |
| 254,906 | Switzerland | of 1949 |